United States Patent
Basavaiah et al.

(10) Patent No.: US 7,934,023 B2
(45) Date of Patent: Apr. 26, 2011

(54) APPARATUS AND METHOD FOR PERFORMING FAST FIBRE CHANNEL WRITE OPERATIONS OVER RELATIVELY HIGH LATENCY NETWORKS

(75) Inventors: Murali Basavaiah, Sunnyvale, CA (US); Satish Ambati, Campbell, CA (US); Magesh Iyengar, Indore (IN); Thomas Edsall, Cupertino, CA (US); Dinesh G. Dutt, Sunnyvale, CA (US); Silvano Gai, San Jose, CA (US); Varagur V. Chandrasekaran, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 648 days.

(21) Appl. No.: 10/726,269

(22) Filed: Dec. 1, 2003

(65) Prior Publication Data

US 2005/0117522 A1    Jun. 2, 2005

(51) Int. Cl.
G06F 3/00    (2006.01)
(52) U.S. Cl. .............. 710/5; 370/230; 370/252; 711/114
(58) Field of Classification Search .................. 370/392, 370/252; 710/5; 707/10; 711/114
See application file for complete search history.

(56) References Cited

U.S. PATENT DOCUMENTS 5,617,421 A    4/1997  Chin et al.
(Continued)

FOREIGN PATENT DOCUMENTS
JP    1008433    1/1989
(Continued)

OTHER PUBLICATIONS

"Fibre Channel—Fabric Generic Requirements (FC-FG)", Dec. 4, 1996, American National Standards Institute, Inc.*

(Continued)

Primary Examiner — Chun-Kuan Lee
Assistant Examiner — Ernest Unelus
(74) Attorney, Agent, or Firm — Weaver Austin Villeneuve and Sampson

(57) ABSTRACT

A method and apparatus to improve the performance of a SCSI write over a high latency network. The apparatus includes a first Switch close to the initiator in a first SAN and a second Switch close to the target in a second SAN. In various embodiments, the two Switches are border switches connecting their respective SANs to a relatively high latency network between the two SANs. In addition, the initiator can be either directly connected or indirectly connected to the first Switch in the first SAN. The target can also be either directly or indirectly connected to the second Switch in the second SAN. During operation, the method includes the first Switch sending Transfer Ready (Xfr_rdy) frame(s) based on buffer availability to the initiating Host in response to a SCSI Write command from the Host directed to the target. The first and second Switches then coordinate with one another by sending Transfer Ready commands to each other independent of the target's knowledge. The second switch buffers the data received from the Host until the target indicates it is ready to receive the data. Since the Switches send frames to the initiating Host independent of the target, the Switches manipulate the OX_ID and RX_ID fields in the Fiber Channel header of the various commands associated with the SCSI Write. The OX_ID and RX_ID fields are manipulated so as to trap the commands and so that the Switches can keep track of the various commands associated with the SCSI write.

26 Claims, 5 Drawing Sheets

U.S. PATENT DOCUMENTS

| | | | |
|---|---|---|---|
| 5,740,171 | A | 4/1998 | Mazzola et al. |
| 5,742,604 | A | 4/1998 | Edsall et al. |
| 5,764,636 | A | 6/1998 | Edsall |
| 5,809,285 | A | 9/1998 | Hilland |
| 5,999,930 | A | 12/1999 | Wolff |
| 6,035,105 | A | 3/2000 | McCloghrie et al. |
| 6,101,497 | A | 8/2000 | Ofek |
| 6,148,414 | A | 11/2000 | Brown et al. |
| 6,188,694 | B1 | 2/2001 | Fine et al. |
| 6,202,135 | B1 | 3/2001 | Kedem et al. |
| 6,208,649 | B1 | 3/2001 | Kloth |
| 6,209,059 | B1 | 3/2001 | Ofer et al. |
| 6,219,699 | B1 | 4/2001 | McCloghrie et al. |
| 6,226,771 | B1 | 5/2001 | Hilla et al. |
| 6,260,120 | B1 | 7/2001 | Blumenau et al. |
| 6,266,705 | B1 | 7/2001 | Ullum et al. |
| 6,269,381 | B1 | 7/2001 | St. Pierre et al. |
| 6,269,431 | B1 | 7/2001 | Dunham |
| 6,295,575 | B1 | 9/2001 | Blumenau et al. |
| 6,400,730 | B1 * | 6/2002 | Latif et al. .................... 370/466 |
| 6,542,961 | B1 | 4/2003 | Matsunami et al. |
| 6,683,883 | B1 * | 1/2004 | Czeiger et al. ................. 370/401 |
| 6,701,410 | B2 * | 3/2004 | Matsunami et al. .......... 711/114 |
| 6,772,231 | B2 | 8/2004 | Reuter et al. |
| 6,847,647 | B1 | 1/2005 | Wrenn |
| 6,850,955 | B2 | 2/2005 | Sonoda et al. |
| 6,876,656 | B2 | 4/2005 | Brewer et al. |
| 6,880,062 | B1 * | 4/2005 | Ibrahim et al. ................ 711/202 |
| 6,898,670 | B2 | 5/2005 | Nahum |
| 6,907,419 | B1 | 6/2005 | Pesola et al. |
| 6,952,734 | B1 | 10/2005 | Gunlock et al. |
| 6,978,300 | B1 * | 12/2005 | Beukema et al. ............. 709/223 |
| 6,983,303 | B2 | 1/2006 | Pellegrino et al. |
| 6,986,015 | B2 * | 1/2006 | Testardi ........................ 711/202 |
| 7,200,144 | B2 | 4/2007 | Terrell et al. |
| 7,237,045 | B2 * | 6/2007 | Beckmann et al. ............. 710/38 |
| 7,269,168 | B2 * | 9/2007 | Roy et al. ..................... 370/374 |
| 7,277,431 | B2 * | 10/2007 | Walter et al. .................. 370/389 |
| 7,353,305 | B2 * | 4/2008 | Pangal et al. ................... 710/74 |
| 7,433,948 | B2 | 10/2008 | Edsall et al. |
| 7,460,528 | B1 * | 12/2008 | Chamdani et al. ............ 370/381 |
| 7,533,256 | B2 * | 5/2009 | Walter et al. .................. 713/153 |
| 7,548,975 | B2 | 6/2009 | Kumar et al. |
| 2001/0037406 | A1 | 10/2001 | Philbrick et al. |
| 2002/0053009 | A1 | 5/2002 | Selkirk et al. |
| 2002/0083120 | A1 | 6/2002 | Soltis |
| 2002/0095547 | A1 | 7/2002 | Watanabe et al. |
| 2002/0103889 | A1 | 8/2002 | Markson et al. |
| 2002/0103943 | A1 | 8/2002 | Lo et al. |
| 2002/0112113 | A1 | 8/2002 | Karpoff et al. |
| 2002/0120741 | A1 | 8/2002 | Webb et al. |
| 2002/0138675 | A1 | 9/2002 | Mann |
| 2003/0026267 | A1 | 2/2003 | Oberman |
| 2003/0131105 | A1 | 7/2003 | Czeiger et al. |
| 2003/0131182 | A1 | 7/2003 | Kumar et al. |
| 2003/0140210 | A1 | 7/2003 | Testardi |
| 2003/0159058 | A1 | 8/2003 | Eguchi |
| 2003/0185154 | A1 * | 10/2003 | Mullendore et al. .......... 370/230 |
| 2003/0210686 | A1 | 11/2003 | Terrell et al. |
| 2004/0028043 | A1 | 2/2004 | Maveli et al. .................. 370/392 |
| 2004/0030857 | A1 * | 2/2004 | Krakirian et al. ............. 711/206 |
| 2004/0039939 | A1 * | 2/2004 | Cox et al. ...................... 713/201 |
| 2004/0057389 | A1 * | 3/2004 | Klotz et al. .................... 370/252 |
| 2004/0088574 | A1 * | 5/2004 | Walter et al. .................. 713/201 |
| 2005/0050211 | A1 * | 3/2005 | Kaul et al. ..................... 709/229 |
| 2005/0076113 | A1 * | 4/2005 | Klotz et al. .................... 709/224 |
| 2005/0091426 | A1 * | 4/2005 | Horn et al. ...................... 710/33 |
| 2005/0117562 | A1 | 6/2005 | Wrenn |
| 2005/0125418 | A1 * | 6/2005 | Brewer et al. ................... 707/10 |
| 2005/0192967 | A1 | 9/2005 | Basavaiah et al. |
| 2006/0274755 | A1 * | 12/2006 | Brewer et al. ................. 370/392 |
| 2008/0320134 | A1 | 12/2008 | Edsall et al. |
| 2009/0185678 | A1 * | 7/2009 | Walter et al. .................... 380/28 |

FOREIGN PATENT DOCUMENTS

| | | |
|---|---|---|
| JP | 02-144718 | 6/1990 |
| JP | 06-195177 | 7/1994 |
| JP | 07-311661 | 11/1995 |
| JP | 9198308 | 7/1997 |
| JP | 2000-029636 | 1/2000 |
| JP | 2000-242434 | 9/2000 |
| JP | 2001-523856 | 11/2001 |
| WO | WO 00/52576 | 9/2000 |
| WO | 01/80013 | 10/2001 |
| WO | WO 03/060688 A2 | 7/2003 |
| WO | WO 03/062979 A2 | 7/2003 |
| WO | 03/084106 | 9/2003 |
| WO | WO 2005/055497 | 6/2005 |

OTHER PUBLICATIONS

Monia et al., "IFCP-A Protocol for Internet Fibre Channel Networking", Dec. 2002, www.ietf.org/ietf/lid-abstracts.txt.

PCT International Search Report dated Mar. 11, 2005 from related PCT Application No. PCT/US2003/00883.

U.S. Office Action dated Mar. 30, 2006 from related U.S. Appl. No. 10/242,374, 19 pages.

U.S. Office Action dated Oct. 2, 2006 from related U.S. Appl. No. 10/242,374, 19 pages.

U.S. Office Action dated Mar. 20, 2007 from related U.S. Appl. No. 10/242,374, 21 pages.

U.S. Office Action dated Aug. 29, 2007 from related U.S. Appl. No. 10/242,374, 21 pages.

U.S. Office Action dated Jan. 2, 2008 from related U.S. Application No. 10/242,374, 21 pages.

European Office Action dated Jun. 8, 2007 from related European Office Action No. 02797469.0, 13 pages.

Examiner's Communicatin (The First Office Action) dated Apr. 7, 2006, from related Chinese Patent Application No. 02828446.1 English translation, 10 pages; and the non-translated original in Chinese, 10 pages.

Vuppala, Vibhavasu and Ni, Lionel M.: "Layer-3 Switching Using Virtual Network Ports," Computer Communications and Networks, 1999. Proceedings. Eight International Conference on Boston, MA, USA Oct. 11-13, 1999, Piscataway, NJ, USA, IEEE. ISBN: 0-7803-5794-9; pp. 642-648.

U.S. Office Action dated May 31, 2005 from related U.S. Appl. No. 10/045,883, 17 pages.

U.S. Office Action dated Oct. 4, 2005 from related U.S. Appl. No. 10/045,883, 15 pages.

U.S. Office Action dated Mar. 21, 2006 from related U.S. Appl. No. 10/045,883, 17 pages.

U.S. Office Action dated Jul. 28, 2006 from related U.S. Appl. No. 10/045,883, 15 pages.

U.S. Office Action dated Feb. 8, 2007 from related U.S. Appl. No. 10/045,883, 16 pages.

U.S. Office Action dated Jul. 23, 2007 from related U.S. Appl. No. 10/045,883, 16 pages.

U.S. Office Action dated Jan. 10, 2008 from related U.S. Appl. No. 10/045,883, 17 pages.

International Search Report dated Oct. 22, 2004 from related PCT Application No. PCT/US02/41079, 6 pages.

China Office Action dated Jul. 4, 2008, from Application No. 200480033685.4.

U.S. Final Office Action dated Aug. 19, 2008 from related U.S. Appl. No. 10/242,374, 21 pgs.

U.S. Office Action dated Aug. 1, 2008 from related U.S. Appl. No. 10/045,883, 12 pages.

Australian Office Action dated May 13, 2008 from related AU Application No. 2002361837, 3 pages.

European Office Action dated Jun. 16, 2008 from corresponding European Office Action No. 02797469.0, 10 pages.

Australian Office Action dated Oct. 9, 2008 from related AU Application No. 2004311001, 2 pages.

Japanese Office Action dated Dec. 9, 2008 from related Japanese Patent Application No. 2003-560717.

Vibhavasu Vuppala, et al., "Layer-3 Switching Using Virtual Network Ports", Computer Communications and Networks, 1999, Proceedings, 8th International Conference, Boston, MA.

Chinese Second Office Action mailed on Jun. 19, 2009, CN Application No. 200480033685.4, 9 pages.

U.S. Notice of Allowance dated May 23, 2008, U.S. Appl. No. 056,238.
U.S. Final Office Action dated Dec. 28, 2007, U.S. Appl. No. 056,238.
U.S. Office Action dated Jun. 6, 2007, U.S. Appl. No. 056,238.
U.S. Office Action dated Jan. 8, 2007, U.S. App. No. 056,238.
U.S. Office Action dated Aug. 17, 2006, U.S. App. No. 056,238.
U.S. Office Action dated Apr. 3, 2006, U.S. App. No. 056,238.
U.S. Final Office Action dated Oct. 19, 2005, U.S. App. No. 056,238.
U.S. Office Action dated May 31, 2005, U.S. App. No. 056,238.
U.S. Final Office Action dated Jan. 20, 2010, U.S. App. No. 12/199,678.
U.S. Office Action dated Aug. 11, 2009, U.S. App. No. 12/199,678.
Restriction Requirement dated May 27, 2009, U.S. App. No. 12/199,678.
U.S. Office Action dated Jun. 25, 2009 from related U.S. Appl. No. 10/242,374, 21 pages.
U.S. Notice of Allowance dated Feb. 9, 2009 from related U.S. Appl. No. 10/045,883, 17 pages.
U.S. Office Action dated May 3, 2006, U.S. Appl. No. 10/791,660.
Austrlian Examiner's First Report dated May 1, 2008, AU Application No. 2003238219.
Canadian Office Action dated Apr. 30, 2009, U.S. Appl. No. 2,473,832.
European Office Action dated May 20, 2008, EP App. No. 03 731 910.0-1245.
Japanese Office Action dated Dec. 9, 2008 , App. No. 2003-5627765.
Japanese Final Office Action dated Jun. 22, 2009, App No. 2003-562776.
Canadian Office Action dated Feb. 9, 2010, CA Application No. 2,472,992.
European Office Action dated Apr. 20, 2009, EP Application No. 02797469.0.
Japanese Office Action dated Dec. 9, 2008 from related Japanese Patent Application No. 2003-560717.
Canadian Office Action dated Mar. 11, 2010, App. No. 2,473,832.
U.S. Examiner's Answer to Appeal Brief dated Jul. 26, 2010 issued in U.S. Appl. No. 10/242,374.
Chinese First Office Action dated Oct. 13, 2006 issued in CN App No. 03806717.X.
Korean Office Action ( Notification of Provisional Rejection) dated Dec. 29, 2009 issued in App. No. 2004-7011405.
PCT International Preliminary Examination Report dated Feb. 21, 2005, PCT/US02/41079 (WO/2003/06068 A2).
PCT International Written Opinion dated Nov. 29, 2004 issued in PCT/US02/41079.
European Examination Report dated Jul. 14, 2010 issued in EP Application 02 797 469.0.
PCT International Search Report dated May 23, 2006 issued in PCT/US2004/039904.
PCT International Preliminary Report on Patentability and Written Opinion dated May 23, 2006 issued in PCT/US2004/039904.
Chinese Third Office Action dated Jul. 19, 2010 issued in CN Application No. 200480033685.4.

* cited by examiner

SCSI CMD FRAME

SCSI DATA FRAME

SCSI RESPONSE FRAME

SCSI TRANSFER READY FRAME

APPARATUS AND METHOD FOR PERFORMING FAST FIBRE CHANNEL WRITE OPERATIONS OVER RELATIVELY HIGH LATENCY NETWORKS

FIELD OF THE INVENTION

The present invention relates generally to network communications, and more particularly, to an apparatus and method for performing fast Fibre Channel write operations over relatively high latency networks.

BACKGROUND OF THE INVENTION

With the increasing popularity of Internet commerce and network centric computing, businesses and other organizations are becoming more and more reliant on information. To handle all of this data, storage area networks or SANs have become very popular. A SAN typically includes a number of storage devices, a plurality of Hosts, and a number of Switches arranged in a Switching Fabric that connects the storage devices and the Hosts.

Most SANs rely on the Fibre Channel protocol for communication within the Fabric. For a detailed explanation of the Fibre Channel protocol and Fibre Channel Switching Fabrics and Services, see the Fibre Channel Framing and Signaling Standard, Rev 1.90, International Committee for Information Technology Standards (INCITS), Apr. 9, 2003, and the Fibre Channel Switch Fabric—2, Rev. 5.4, INCITS, Jun. 26, 2001, and the Fibre Channel Generic Services—3, Rev. 7.01, INCITS, Nov. 28, 2000, all incorporated by reference herein for all purposes.

The infrastructure of many networks often includes multiple types of link level transports. For example, the communication network of an international corporation may have local SANs in their New York, Silicon Valley and Tokyo offices respectively. However, since maintaining a SAN across long distances is expensive, the organization may rely on the Internet Protocol (IP) over another inter-SAN link such as Gigabit Ethernet, SONET, ATM, wave division multiplexing, etc. to connect the SANs.

Within a typical SAN with Fibre Channel Inter-Switch Link (ISLs), the access time between a Host and a storage device (i.e., a target) is typically very fast. The speed of a Fibre Channel link is such that the performance or access time across multiple switches in close to the ideal, i.e., the Host and the target device are attached to the same switch. In other words, even if multiple Switches need to be spanned to complete the access, the speed of the individual Switches is so fast that the latency time is typically very small. In a write operation for example, packets of data can be transferred across the switches of the SAN without delay as the latency between the ISLs is very small.

In situations with a high latency inter-SAN link, however, the access time of a write operation between a Host in one SAN and a storage device in a remote SAN will suffer or deteriorate. The latency may result from the speed of the link, the distance between the Host and target, congestion on the inter-SAN link, etc. For example, when IP is used to connect two Fibre Channel SANs, the latency across the IP portion of the network is typically slow relative to an access within the SANs.

With a SCSI write command, the Host will issue a write (Wr) command defining a certain amount of data to be written. The command travels across the network, from switch to switch, until it reaches the target. In reply, the target responds with a Xfer ready command which defines the amount of data which the target may accept. When the Host receives the Xfer ready command, it transfers the data to be written in units up to the maximum transfer unit (MTU) of the network. In most Fibre Channel SANS, the MTU is approximately 2K bytes per transfer. Thus if the amount of data to be written is 8K bytes, then a total of four transfers are required. When in this case all four data transfers are received, the target generates a status success command. If for some reason the Host does not receive the status command after a predetermined period of time, it is assumed that a problem with the write operation occurred. The Host may subsequently issue another write command.

The time required to complete a SCSI write operation can be significant over a high latency inter-SAN network. A significant amount of time may lapse between the time the initial Wr command is issued and the Xfer ready is received by the Host due to the slow performance of the high latency inter-SAN network. During this time, the Host is idle and must wait until before issuing the data transfer commands to transfer the data to the Host. The target is also idle until it receives the data from the initiating Host. In other words, the initiating Host is idle until it receives the Xfer ready and the target is idle after issuing the Xfer ready until it receives the data.

An apparatus and method improving the performance of a SCSI write over a relatively high latency network is therefore needed.

SUMMARY OF THE INVENTION

To achieve the foregoing and other objectives and in accordance with the purpose of the present invention, an apparatus and method to improve the performance of a SCSI write over a high latency network is provided. The apparatus includes a first Switch close to the initiator in a first SAN and a second Switch close to the target in a second SAN. In various embodiments, the two Switches are border switches connecting their respective SANs to a relatively high latency network between the two SANs. In addition, the initiator can be either directly connected or indirectly connected to the first Switch in the first SAN. The target can also be either directly or indirectly connected to the second Switch in the second SAN. During operation, the method includes the first Switch sending Transfer Ready (Xfr_rdy) frame(s) based on buffer availability to the initiating Host in response to a SCSI Write command from the Host directed to the target. The first and second Switches then coordinate with one another by sending Transfer Ready commands to each other independent of the target's knowledge. The second switch buffers the data received from the Host until the target indicates it is ready to receive the data. Since the Switches send frames to the initiating Host independent of the target, the Switches manipulate the OX_ID and RX_ID fields in the Fibre Channel header of the various commands associated with the SCSI Write. The OX_ID and RX_ID fields are manipulated so as to trap the commands and so that the Switches can keep track of the various commands associated with the SCSI write.

BRIEF DESCRIPTION OF THE DRAWINGS

The features of the present invention may best be understood by reference to the following description of the presently preferred embodiments together with the accompanying drawings.

Like reference numbers refer to like elements in the figures.

DETAILED DESCRIPTION OF THE INVENTION

Figure 1:
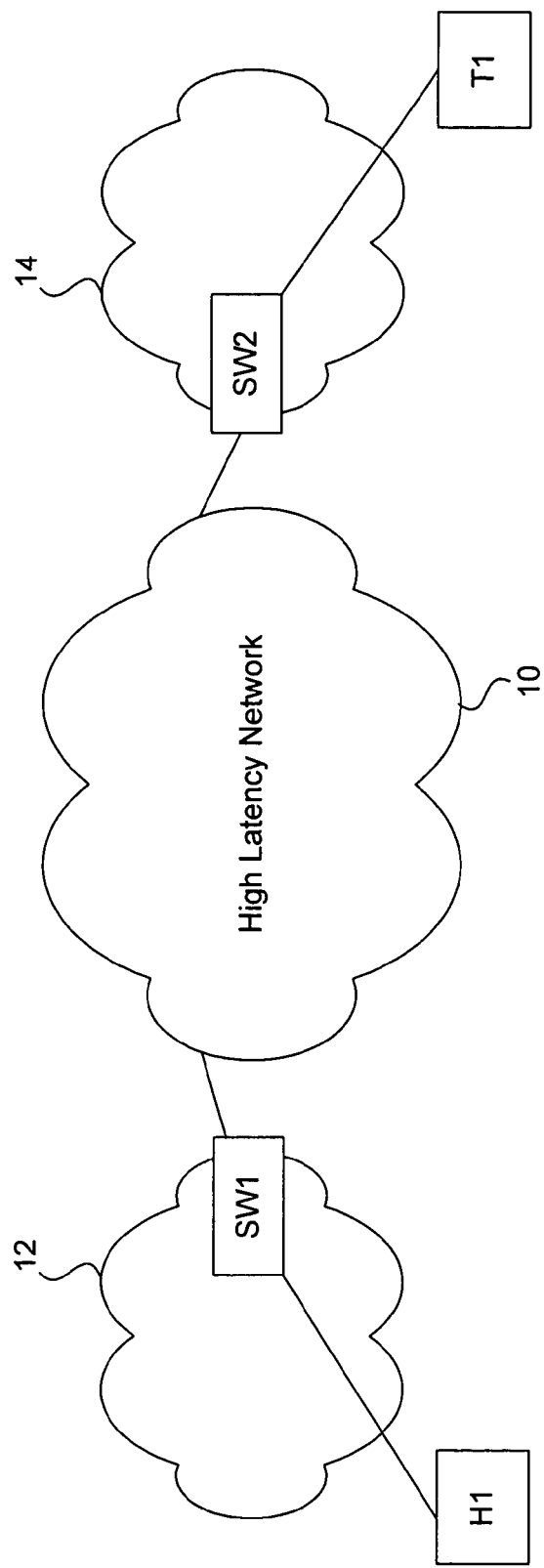
FIG. 1 is a diagram of a high latency network connecting a Host in a first SAN and a storage device in a second SAN.

Referring to FIG. 1, a diagram of a high latency inter-SAN network 10 connecting a Host H1 in a first SAN 12 and a target storage device T1 in a second SAN 14 is shown. The Host H1 is coupled to the high latency network 10 through a first switch SW1 in SAN 12. The target storage device T1 is coupled to the network 10 through a second switch SW2. The switches SW1 and SW2 are considered "border" switches since they are positioned at the interface of the network 10 and the SANs 12 and 14 respectively. According to various embodiments, the Host H1 and target T1 may be either directly connected to switches SW1 and SW2 or connected indirectly through any number of intermediate switches respectively. The network 10 may use the Internet Protocol (IP) for example over an inter-SAN link such as Gigabit Ethernet, SONET, ATM, wave division multiplexing, etc. to connect the SANs 12 and 14. Again, the network 10 may have a high latency relative to the SANs 12 and 14 for a variety of reasons, such as the speed of the link, congestion on the link, or distance.

The present invention is related to a SCSI write operation that improves or reduces the time required to perform a write operation between the initiating Host H1 and target storage device such T1 over a high latency network such as the inter-SAN network 10. The Intelligent Ports (I-ports) of the two switches SW1 and SW2 act as an intermediary between the Host H1 and the storage device T1. The transfer size of a data transfer during a write operation is negotiated before any write operations are performed. Initially, the Host H1 defines (i.e., specifies the amount of data it wishes to write) the transfer size for a write command. The switch SW1 indicates the amount of data it is ready to receive based on (i) the data size specified in the Write command and (ii) the amount of buffer space it has. The I-port on SW1 responds with a Transfer Ready (Xfer) which indicates the maximum size of a data transfer. The I-port on the switch SW2 similarly receives the Xfer ready which defines the maximum size of the data transfer. In the aforementioned embodiment, the ports involved are Intelligent Ports (I-Ports) to which the initiator and target are attached. In such a case, the I-port is typically a FC port also sometimes referred to as an Fx_Port. In an alternative embodiment, the target and the initiating Host are not directly connected to the Switches in question. In such a case, the I-port can be either an IP-port or an I-port.

In general, the fast write operation is performed after the initial negotiation by the following sequence: (i) when the Host Hi generates a SCSI write command defining the target T1, the I-port of Switch SW1 traps the command; (ii) the switch SW1 forwards the command to the target; (iii) the switch SW1 also issues a Transfer Ready command to the Host H1 on behalf of or as a proxy for the target T1; (iv) the Host H1 sends data of the amount indicated by the Transfer Ready amount to the target T1 in response to the received Transfer Ready command. The data may sequenced or broken up into frames based on the maximum transfer unit (MTU) of the network; (v) the I-port of the switch SW1 receives the data frames and forwards it to the target T1; (vi) the previous two steps are repeated until all the data is transferred to the target; and (vii) after all the data is transferred, the switch SW1 waits for either a success or error status command from the target T1. Upon receipt, the switch SW1 forwards the status command back to the Host H1. If the target returns an error command, no attempt is made by the I-port to correct the error. In should be noted that in an alternative embodiment, the above sequence can be performed by switching the order of steps (ii) and (iii) as defined above.

The I-port of the second switch SW2 operates essentially the same as switch SW1 except that it buffers the received data frames until receiving a Transfer Ready command from the target T1. Specifically, the I-port of switch SW2: (i) forwards the SCSI write command received from switch SW1 to the target; (ii) issues a Transfer Ready command to the switch SW1 as a proxy for the target T1; (iii) buffers the data frames received from the switch SW1; (iv) transfers the data frames to the target T1 when a Transfer Ready command is received from the target T1; and (v) after all the data is transferred, the switch SW2 waits for either a success or error status command from the target T1. Upon receipt, the switch SW2 forwards the status command back to switch SW1. If the target returns an error command, no attempt is made by the I-port of switch SW2 to correct the error.

To identify an FC device, Fibre Channel Identifiers (FC-IDs) are used. A transaction between an FC host and a target is referred to as an exchange. In a typical Fibre Channel network, there are many Hosts and targets. Each Host may initiate many read and/or write operations. For the hosts and targets within a network to keep track of the various transactions between each other, two fields are available in the Fibre Channel header for all SCSI Command, Data, Response, and Transfer Ready frames. The first field is called the Originator Exchange Identifier or OX_ID. The second field is called the Receiver Exchange Identifier or RX_ID. The Host relies on the OX_ID to maintain its local state and the target relies on the RX_ID to maintain its local state. In both cases, the OX_ID and RX_ID are typically 16 bits wide.

The OX_ID and RX_ID are typically used by the initiating host and target of a transaction respectively to keep track of the ongoing transactions between the two entities. In general, the switches in a SAN do not keep track of such transactions. With the present invention, however, the switches SW1 and SW2 are acting as intermediaries between the initiating Host and the target T1. The switches SW1 and SW2 therefore also use the OX_ID and RX_ID values to track exchanges between the Host H1 and the target T1.

Figure 2A:
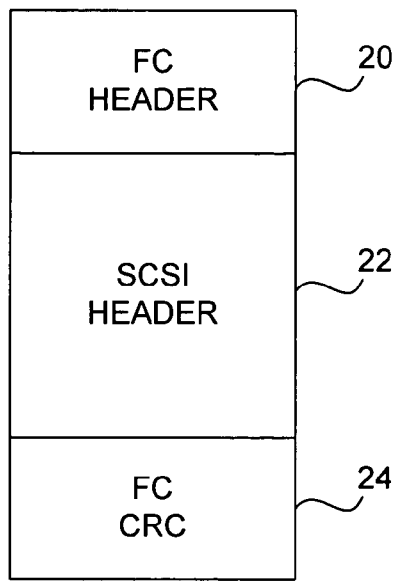
FIGS. 2A-2D are SCSI Command, Data, Response and Transfer Ready frames respectively.
Figure 2B:
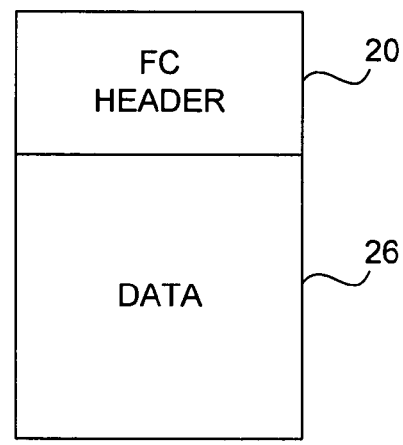
Figure 2C:
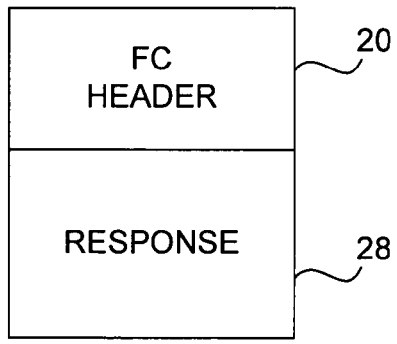
Figure 2D:
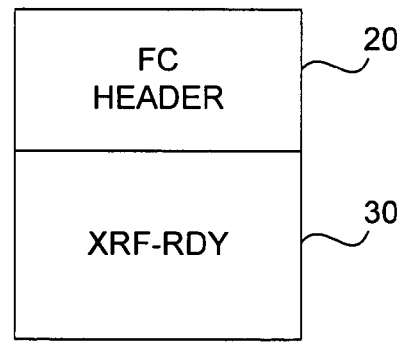

Referring to FIGS. 2A-2D, SCSI Command, Data, Response and Transfer Ready frames are shown respectively. As illustrated in FIG. 2A, the SCSI command frame includes a FC header field 20, a SCSI header field 22, and a FC-CRC field 24. As illustrated in FIG. 2B, the SCSI Data frame includes a FC header field 20 and a data field 26. As illustrated in FIG. 2C, the SCSI Response frame includes a FC header field 20 and a response frame 28. As illustrated in FIG. 2C, the SCSI Transfer Ready frame includes a FC header field 20 and a transfer ready (Xfr-rdy) field 30.

Figure 3:
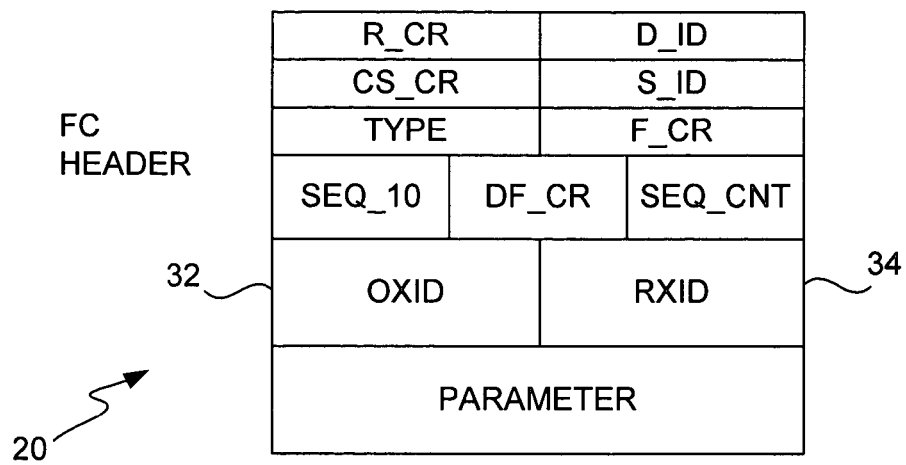
FIG. 3 is a diagram of a Fibre Channel header.

Referring to FIG. 3, a diagram of a Fibre Channel header field 20 is shown. The frame includes an OX_ID field 32 and an RX_ID field 34 along with a number of other fields (which are labeled in the figure but not described herein for the sake of brevity). As previously noted, the OX_ID field 32 and the RX_ID field 34 are each 16 bits wide and are used for identifying the originating Host and target device. Since each of the above-identified SCSI frames includes a header field 20 with an OX_ID field 32 and an RX_ID field 34, the switches in a Fibre Channel network can track of a given SCSI exchange between the identified originating Host and target device.

Figure 4:
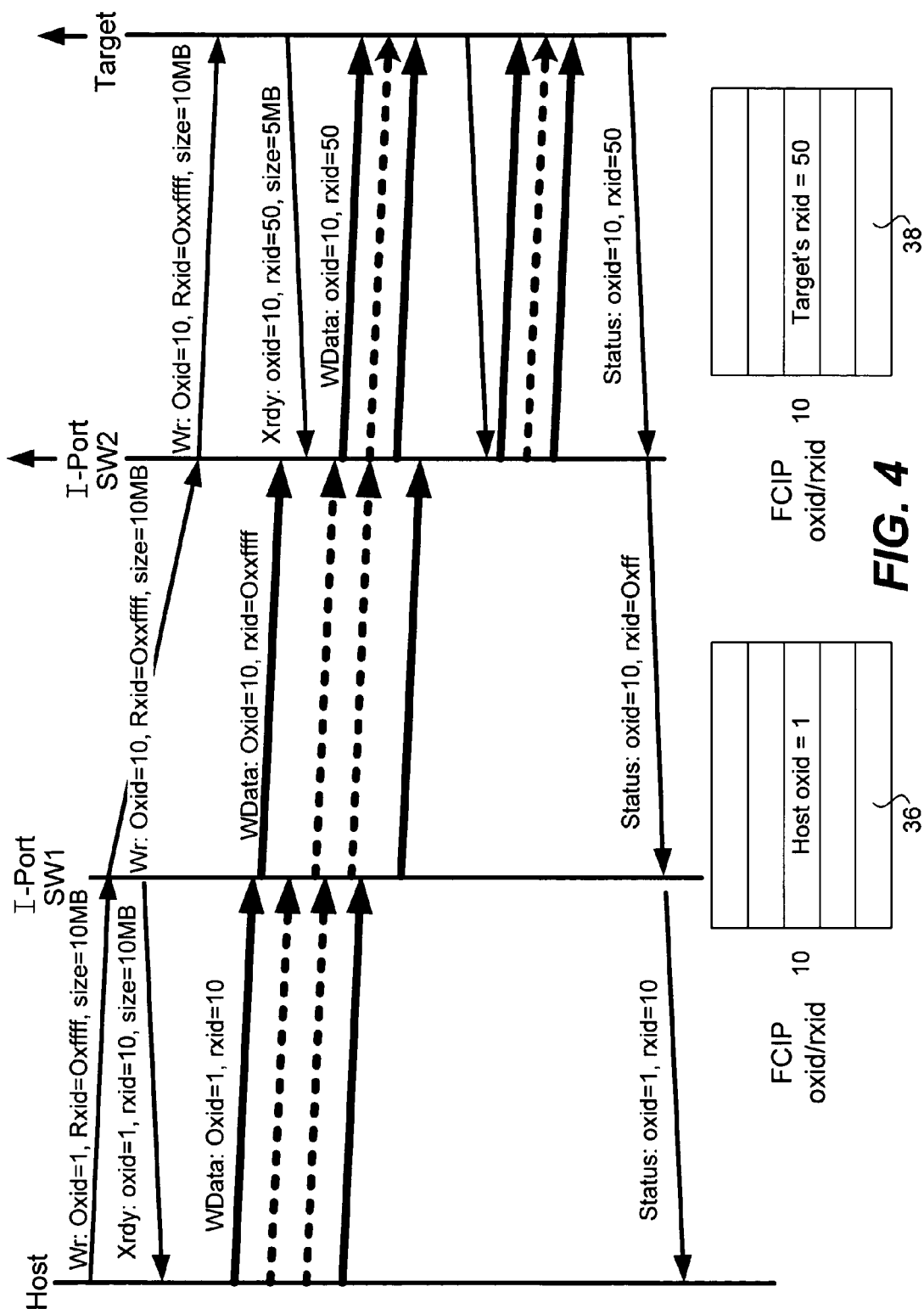
FIG. 4 is a temporal diagram illustrating a SCSI fast write operation over a high latency network according to one embodiment of the present invention.

Referring to FIG. 4, a temporal diagram is shown illustrating a SCSI write operation between the Host H1 in SAN 12 and target T1 over a inter-SAN network 10 according to the present invention. In the diagram, the direction of the arrows shows the flow of frames during the write operation. The vertical column, from top to bottom, indicates the passage of time. When a SCSI write operation is performed between the Host H1 and the target T1, the following sequence of events occur:

a. Host H1 initiates the fast write operation by issuing a SCSI write command (Wr: OX_ID=1 RX_ID=0Oxffff, Size=10 MB). The command defines the originating exchange identifier as 1 (OX_ID=1). The receiving exchange identifier RX_ID, however, is "uninitialized" and is set to a default value of "Oxffff". The write command also specifies the amount of data to be written, which in this example, is 10 megabytes (MB).

b. Upon receipt, the switch SW1 initializes the receiving exchange identifier RX_ID. In this example, the RX_ID is initialized to 10. The switch SW1 then determines if it has sufficient storage space to buffer the data. Assuming that it does, the switch SW1 sends a Transfer Ready command (Xrdy: OX_ID=1, RX_ID=10, Size=10 MG) to the Host H1. All subsequent commands or frames between the Host and switch SW1, and vice versa, associated with this SCSI write operation define the OX_ID=1 and the RX_ID=10. If the switch SW1 does not have sufficient buffer space, then a SCSI busy status is returned to the host H1, mimicking the behavior of a target when the target does not have resources for a new exchange.

c. The initiating switch SW1 uses the OX_ID to keep track of the transaction. Consequently, the switch SW1 changes the OX_ID provided by the initiating Host H1. In this example, the switch SW1 changes the OX_ID value to 10. The switch SW1 then forwards the write command to the target T1 with the RX_ID value remaining uninitialized (Wr: OX_ID=10, RX_ID=Oxffff, Size=10 MB). All communication between the first switch SW1 and the target involving this write operation thereafter includes an OX_ID=10 and RX_ID=Oxffff. The initiating switch SW1 uses the OX_ID value as a handle or pointer into a session table 36 maintained at switch SW1. The table includes an entry that includes information regarding the session that is accessed by the RX_ID handle.

d. When the second switch SW2 receives the write command, it initializes an exchange identifier entry in the sessions table 38 and it immediately forwards the command to the target T1 provided the switch SW2 has sufficient buffer space. If it does not have sufficient space, then a SCSI busy status is sent back to the initiating host H1.

e. If the target T1 is ready to receive the data, it sends a Transfer Ready command back to the switch SW2. According to one embodiment, the target designates an RX_ID value for the write transaction. In this case, the target designates an RX_ID value of 50. The Transfer Ready command received by the switch SW2 therefore appears as (Xrdy: OX_ID=10, RX_ID=50, size=10 MB). All subsequent communications between the switch SW2 and the target T1 involving this transaction include OX_ID value of 10 and an RX_ID value of 50. The switch SW2 also maintains a sessions ID table 38. Upon receipt of the Transfer Ready command, the switch SW2 inserts a RX_ID=50 value into the table. The switch SW2 uses the modified OX_ID=10 value as a handle or pointer into a sessions ID table 38. The target switch SW2 uses the OX_ID value as a handle or pointer for this session between in session table 38. The table includes an entry that includes the information regarding the session such as the target RX_ID.

f. If the second switch SW2 receives the data frames (Wdata: OX_ID=10, RX_ID=Oxffff) from the first switch SW1 before the Transfer Ready command from the target T1, then the second switch SW2 buffers the data. When the Transfer Ready command is received, the data frame(s) are then forwarded to the target T1. On the other hand, if the data frames arrive after the Transfer Ready command, the data frames are immediately forwarded to the target T1.

g. When all the data has been transferred, the target T1 generates a Status command (Status: OX_ID=10, RX_ID=50). The second switch SW2 modifies the RX_ID=Oxffff and forwards the status command to the switch SW1. The switch SW1 in turn changes the RX_ID=10 and sends the status command to the Host H1 to complete the fast write operation. It should be noted that in the event the target T1 provides a transfer size less than the requested size, the I-port on the switch SW2 waits for successive Transfer Ready commands until the requested size is met1.

It also should be noted that the Switches SW1 and SW2 "trap" Extended Link Service or ELS frames (state management frames) that contain the original OX_ID and RX_ID in the payload since the switches change the original values of OX_ID and RX_ID. ELS frames are used by the initiator H1 and target T1 to query and manage state transactions, such as ABTS and REC ELS frames.

Figure 5:
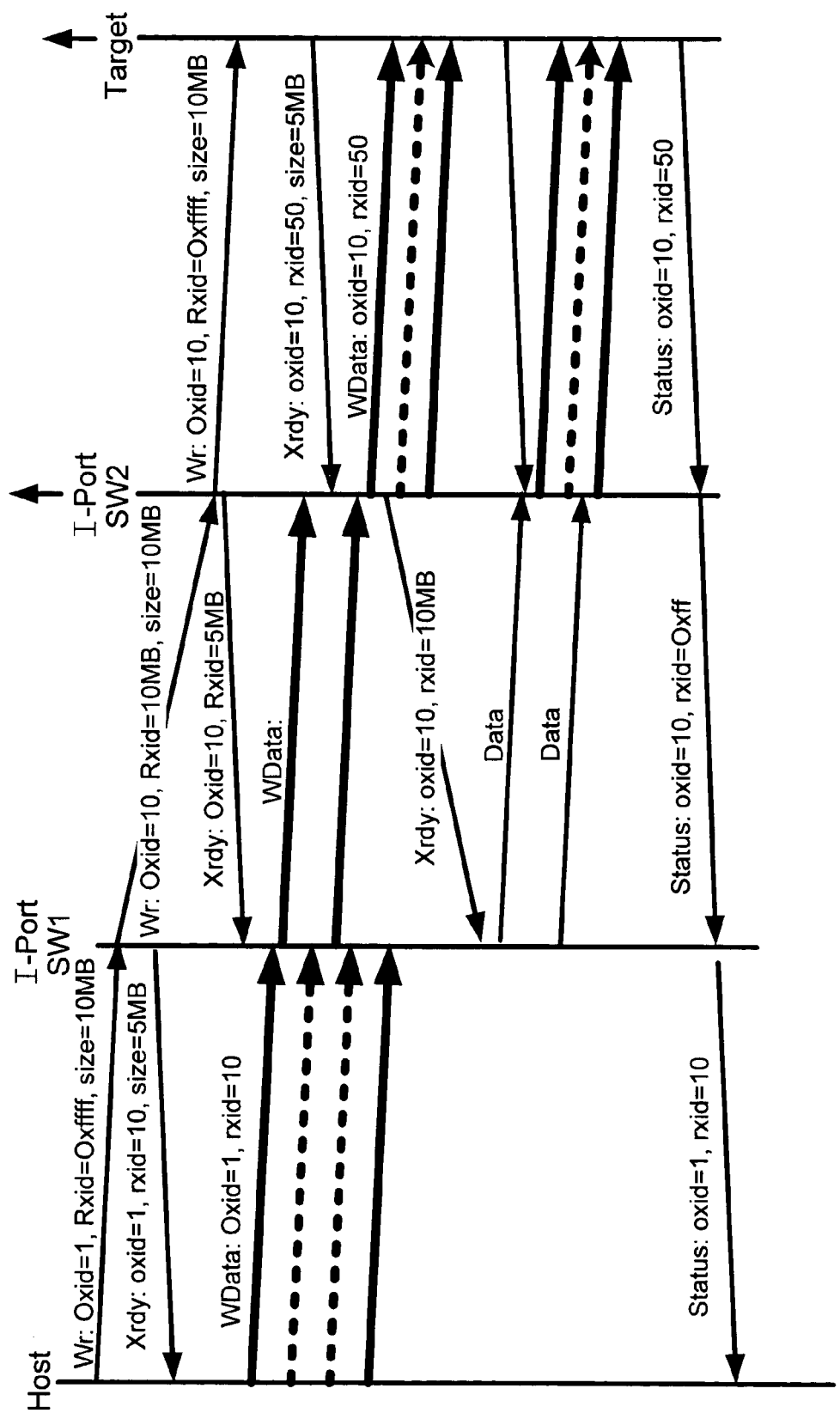
FIG. 5 is a temporal diagram illustrating a SCSI fast write operation over a high latency network according to another embodiment of the present invention.

Referring to FIG. 5, an alternative embodiment of the present invention is shown. With this embodiment, the RX_ID, command frame Wr and the Transfer Ready frame Xry are used by the switches SW1 and SW2 to communicate with one another regarding buffer availability and allocation for a transaction. In FIG. 5 for example, the switch SW1 uses the RX_ID=10 value in the Wr command (Wr: OXID=10, RXID=10 MB, size=10 MB) to (i) specify the amount of buffer space neeeded for the write transaction; and (ii) use the command frame to request the needed buffer space. The switches also use the Transfer Ready frame to grant buffer space for the transaction. In this example, the switch SW2 generates a first Transfer Ready command with 5 MB encoded in the RX_ID value (Xrdy: OX_ID=1, RX 5 MB). The issued Transfer Ready command indicates to the switch SW1 that 5 MB have been allocated for the write transaction. The switch SW1 consequently sends up to 5 MB to switch SW2. When a second 5 MB of buffer space becomes available, a second Transfer Ready command is issued (Xrdy: OX_ID=1, RX_ID=10, Size=10 MB). Note, the RX_ID value for the second command is set to 10 MB, indicating that the accumulative or total allocated buffer space for the transaction is 10 MBs. The second Transfer Ready indicates that the remaining 5 MB of buffer space is now available.

In an alternative embodiment, it is possible for switch SW2 to grant more buffer space than requested by SW1. Based on the previous example, SW2 could grant 15 MB instead of 10 MB. The remaining unutilized buffers are used for subsequent Write commands from the Host H1. For example, consider a second Write command for say 1 MB from the Host H1. With this embodiment, SW1 would send a Xfr_Rdy for 1 MB to the Host H1 and send the command to the target via SW2 as stated in paragraph 0021. When the Host H1 sends data, SW1, instead of waiting for Xrdy_Rdy to come from SW2 before sending data, now immediately starts transferring the data to SW2. It can do this because SW2 had previously granted additional buffers to SW1 via the last Xrdy_Rdy command. The basic idea is that the data can be transferred from SW1 to SW2 for subsequent (after the first) write commands without waiting for a specific Xrdy_Rdy from SW2 pertaining to the subsequent write.

In various embodiments of the invention, a number of alternatives may take place in situations where the switch SW1 has no available buffer space. In one embodiment, the Host H1 receives a busy status signal and the Host must re-try the write transaction; In a second embodiment, the command is placed in a pending command list. Eventually, the switch SW1 responds to the write but only after the processing the preceding transactions on the list. In yet another embodiment, the switch SW1 can simply forward the Write command to the target.

In yet another embodiment, the switches SW1 and SW2 are configured to set the Burst Length and Relative Offset fields in the Transfer Ready frame both to zero (0). This enables the other switches to differentiate if the Transfer Ready command was generated by the target switch or the target itself. The initiating switch and Host realizes that the target switch issued the Transfer Ready when both fields are set to zero (0) since the target itself would never set both to zero for a given transaction. If only one or neither of the fields are set to zero, then the initiating switch SW1 and Host realizes the Transfer Ready was generated by the target.

In data networks, data frames are lost on occasion. In various embodiments of the present invention, an one of a number of different buffer credit recovery schemes may be used.

Figure 6:
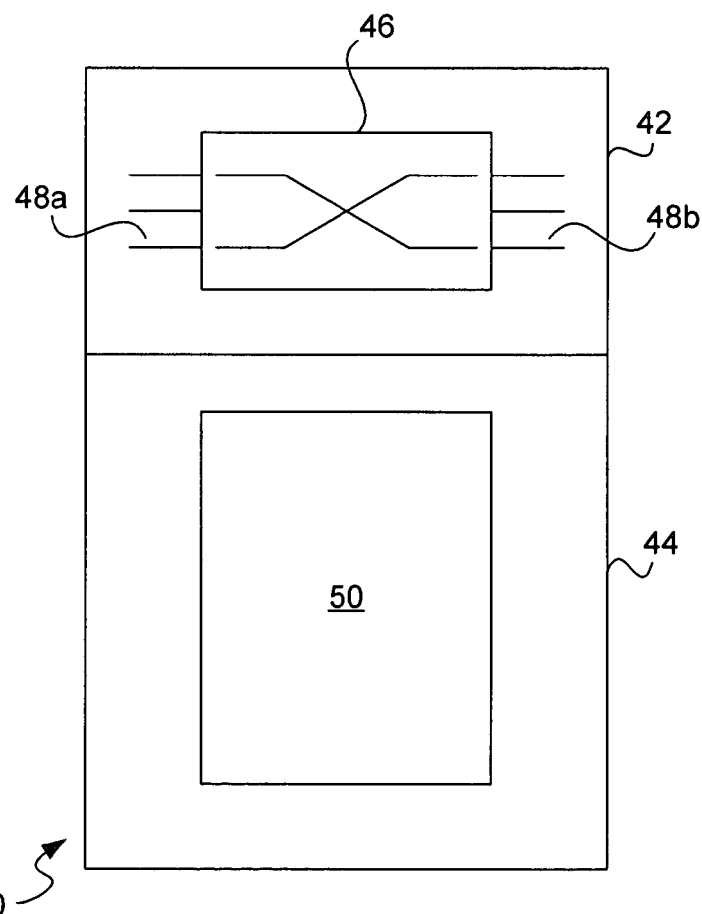
FIG. 6 is a block diagram of a switch according to the present invention.

Referring to FIG. 6, a block diagram of a switch SW according to the present invention is shown. The switch 40 includes a data plane 42 and a control plane 44. In the data plane 42, the switch includes switching logic 46 connected between two sets of ports (including the I-ports) 48$a$ and 48$b$. The switching logic 46 is configured to route or internally switch traffic received on one port 48$a$ to another port 48$b$ and vice versa. The control plane 44 includes a processor 50 for implementing all the switching Fibre Channel functionality and protocols such as those specified in the aforementioned INCITS documents, incorporated by reference herein, the Fibre Channel adapted versions of OSPFv3, IS-IS and/or BGP4+ routing protocols, or any other protocols useful for either intra-Switch or inter-switch communication. In various embodiments of the invention, the processor 50 may be implemented in a state machine, a micro-controller, hardware, firmware, programmable logic, or a combination thereof. As previously noted, the I-ports of the switch 40 negotiate with the initiating host the amount of data that can be transferred by a Write command (Wr) without waiting for a Transfer Ready command command from the target. This negotiation can takes place, for example, when the initiating Host issues a PLOGI or a PRLI to the target storage device. After the negotiation, the I-ports of the initiating and target switches SW1 and SW2 set up hardware filters to trap the any SCSI Write Commands between the specified Virtual SANs (VSANs) and initiating Host FC_ID and target device FC_ID. The trap is based on a tuple defined by VSAN, Host FC_ID, target FC_ID, OX_ID and RX_ID of the frame. Whenever a command defining the specified tuple is received, the command is trapped by the switch. The term "trap" has used herein means the frame is not forwarded its destination, but rather is provided to the processor 50 of the switch for further processing.

When a Write command is received at the initiating switch SW1 that specifies a tuple to be trapped, the switch SW1 forwards it to the processor 50. In reply, the processor 50 is responsible for forwarding the original frame on to the original destination and generating a Transfer Ready command to the initiating Host H1. The Transfer Ready command defines a data size determined by the existing buffer space at the switch SW1. The processor also defines the locally generated RX_ID which is used for all subsequent communication between the switch SW1 and the initiating Host H1. When the data frame is received from the Host H1 at the I-port of the switch SW1, the frame is trapped. The processor 50 in turn instructs the switch SW1 to transmit the data frames up to the negotiated size without waiting to receive a Transfer Ready command. Any remaining claims are buffered. Similarly, at the I-port of the switch SW2, any data frames associated with this exchange are trapped and buffered. When a Transfer Ready is received from the target T1, the switch SW2 transfers the buffered data.

Transfer Ready frames involving this exchange received by either switch SW1 and SW2 are also trapped and forwarded to the processor 50. The target switch SW2 uses the Transfer Ready frame to start the transfer of data to the target. The initiating switch SW1 on the other hand, uses the Transfer-Ready command to transmit more data frames toward the target. In either case, the I-ports of both switches SW1 and SW2 modify the RX_ID's.

According to one embodiment, the Fibre Channel cyclical redundancy check or CRC included in the Fibre Channel header 20 is recomputed to protect rewrite operations. The CRC protects FC payload and FC header from corruption while traversing various parts of a Fiber Channel SAN. With the present invention, the RX_ID and OX_ID fields are modified, the FC headers need to be protected and the CRC recomputed to protect the rewrites from any corruption.

Although only a few embodiments of the present invention have been described in detail, it should be understood that the present invention may be embodied in many other specific forms without departing from the spirit or scope of the invention. Therefore, the present examples are to be considered as illustrative and not restrictive, and the invention is not to be limited to the details given herein but may be modified within the scope of the appended claims.

The invention claimed is:

1. A switch comprising:
   a port configured to receive a write command frame, the frame having a header comprising an originator exchange identifier (OX_ID) field and a receiver exchange identifier (RX_ID) field, as well as a Host identifier field and a target identifier field, wherein the Host and the target identifier fields identify Host and target devices, and wherein the OX_ID and the RX_ID exchange identifier fields enable the Host and the target to keep track of various transactions between each other;
   a trapping mechanism configured to trap the write command frame; and
   a processor configured to process the trapped write command frame by modifying the OX_ID field of the write command frame header to include a new value of an OX_ID exchange identifier before sending the write command frame to the target;
   wherein the processor is further configured to generate a transfer ready command frame, initialize a receiver exchange identifier (RX_ID) of the transfer ready command frame by assigning a value to the RX_ID field, the assigned RX_ID corresponding to a write command session, send the transfer ready command frame to the initiating Host before receiving a transfer ready command frame from the target;

receive a command frame with the assigned RX_ID value; and use the RX_ID value as a handle for accessing information pertaining to the write command session in a sessions table, the sessions table storing information about one or more sessions or exchanges.

2. The switch of claim 1, wherein the switch is an initiating Switch coupled to the Host in a first SAN.

3. The switch of claim 2, wherein the processor of the initiating Switch is further configured to modify the write command frame before forwarding the write command to the target.

4. The switch of claim 2, wherein the processor of the initiating Switch is further configured to issue a Transfer Ready command to the Host.

5. The switch of claim 2, wherein the initiating Switch is further configured to transfer additional data frames to the target when the initiating Switch receives a Transfer Ready command associated with the write command frame from the target.

6. The switch of claim 1, wherein the switch is further configured to use the assigned RX-ID value as the RX_ID for all communication related to the write command between the switch and the Host.

7. The switch of claim 1, wherein the switch is further configured to use the new OX_ID value as the OX_ID in all communications between the switch and the target.

8. The switch of claim 1, wherein the switch is further configured to use the RX_ID value of trapped write commands to specify the amount of buffer space needed for the write command and use the write command frame to request the needed buffer space.

9. The switch of claim 8, wherein the switch is further configured to use the RX_ID value of trapped write commands to specify the amount of buffer space larger than needed for the write command and use the additional buffer space for subsequent write commands so that the switch need not wait for a Transfer Ready command to transfer data related to the subsequent write command.

10. The switch of claim 1, wherein the switch is further configured to, in the event the switch does not have sufficient buffer space for the write command, to either: (i) generate a busy status signal to the initiating Host; (ii) place the write command on a pending wait list; or (iii) forward the write command to the target.

11. The switch of claim 1, further comprising: a first SAN including the switch; a second SAN; and an inter-SAN network connecting the first SAN and the second SAN.

12. The switch as recited in claim 1, wherein the switch is further configured to determine from the write command an amount of data to be written to the target, to ascertain whether it has sufficient storage space to buffer the amount of data, and to send the generated transfer ready command frame to the initiating Host before receiving a transfer ready command from the target if the switch has determined that it has sufficient storage space to buffer the amount of data.

13. The switch as recited in claim 1, wherein the trapping mechanism is configured to trap the write command frame if the write command frame designates a predetermined Host_ID and a predetermined target_ID.

14. A method comprising:
receiving a write command at a switch, the write command specifying a host identifier corresponding to a host device and a target identifier corresponding to a target device, the write command also including an originator exchange identifier (OX_ID) field with an assigned value and an uninitialized receiver exchange identifier (RX_ID) field with a default value, wherein the OX_ID and the RX_ID fields enable the host and the target to keep track of various transactions between each other;

generating a transfer ready command at the switch; initializing a receiver exchange identifier (RX_ID) of the transfer ready command by assigning a value to the RX_ID field, the assigned RX_ID value corresponding to a write command session;

sending a transfer ready command including the initialized RX_ID to the host prior to receiving a transfer ready command from the target, wherein sending the transfer ready command to the host allows the switch to operate as a proxy for the target;

modifying the originator exchange identifier (OX_ID) of the write command to generate a modified write command;

forwarding the modified write command to the target;
receiving a command with the assigned RX_ID value; and using the RX_ID value as a handle for accessing information pertaining to the write command session in a sessions table, the sessions table storing information about one or more sessions or exchanges.

15. The method of claim 14, further comprising configuring the switch to forward data frames associated with the write command received in response to the transfer ready command to the target.

16. The method of claim 15, wherein a second switch between the switch and the target receives data frames associated with the write command and buffers the data frames until a transfer ready command is received from the target.

17. An apparatus comprising:
means for receiving a write command at a switch, the write command specifying a host identifier corresponding to a host device and a target identifier corresponding to a target device, the write command also including an originator exchange identifier (OX_ID) field with an assigned value and an uninitialized receiver exchange identifier (RX_ID) field with a default value, wherein the OX_ID and the RX_ID exchange identifier fields enable the host and the target to keep track of various transactions between each other;

means for generating a transfer ready command;
means for initializing a RX_ID of the transfer ready command by assigning a value to the RX_ID field, the assigned RX_ID value corresponding to a write command session;

means for sending a transfer ready command including the initialized RX_ID to the host prior to receiving a transfer ready command from the target, wherein sending the transfer ready command to the host allows the switch to operate as a proxy for the target;

means for modifying the OX_ID field of the write command to generate a modified write command;

means for forwarding the modified write command to the target;

means for receiving a command with the assigned RX_ID value; and means for using the RX_ID value as a handle for accessing information pertaining to the write command session in a sessions table, the sessions table storing information about one or more sessions or exchanges.

18. A method comprising:

receiving a write command at a switch, the write command specifying a host identifier corresponding to a host device and a target identifier corresponding to a target device, the write command also including an originator exchange identifier (OX_ID) field and a receiver exchange identifier (RX_ID) field, wherein the OX_ID and the RX_ID exchange identifier fields enable the host and the target to keep track of various transactions between each other;

assigning a new value to the OX_ID field in the write command;

forwarding the write command to the target;
receiving a transfer ready command from the target;
sending the transfer ready command to the host;
receiving a command with the assigned OX_ID value; and using the OX_ID value as a handle for accessing information pertaining to the write command session in a sessions table, the sessions table storing information about one or more sessions or exchanges.

19. A switch comprising:

an interface;

a processor; and a memory, at least one of the interface, the processor or the memory being for:

receiving a write command, the write command specifying a host identifier corresponding to a host device and a target identifier corresponding to a target device, the write command also including an originator exchange identifier (OX_ID) field and a receiver exchange identifier (RX_ID) field, wherein the OX_ID and the RX_ID exchange identifier fields enable the host and the target to keep track of various transactions between each other;

assigning a new value to the OX-ID field in the write command:

forwarding the write command to the target;
receiving a transfer ready command from the target;
sending the transfer ready command to the host;
receiving a command with the assigned OX_ID value; and using the OX_ID value as a handle for accessing information pertaining to the write command session in a sessions table, the sessions table storing information about one or more sessions or exchanges.

20. The switch of claim 19, wherein the switch is a target Switch coupled to the target.

21. The switch of claim 20, wherein the target Switch forwards the write command frame to the target.

22. The switch of claim 21, wherein the target Switch forwards data frames associated with the write command frame to the target after receiving a Transfer Ready command from the target.

23. The switch of claim 22, wherein the target Switch is further configured to buffer the data frames prior to receipt of the Transfer Ready command.

24. The switch of claim 22, wherein the target Switch is further configured to maintain a sessions ID table and to use the OX_ID value of the write command frame as an index to the session corresponding to the write command.

25. The switch of claim 24, wherein the target Switch is further configured to modify the OX_ID value in communications between the target Switch and the target.

26. The switch of claim 20, wherein the target Switch is further configured to modify the RX_ID value for all communication related to the write command frame between the target Switch and the Host.

* * * * *